DAVIS DOUGLAS WILSON
GEORGE DEMO PAPPAS
INVENTOR.

ATTORNEY

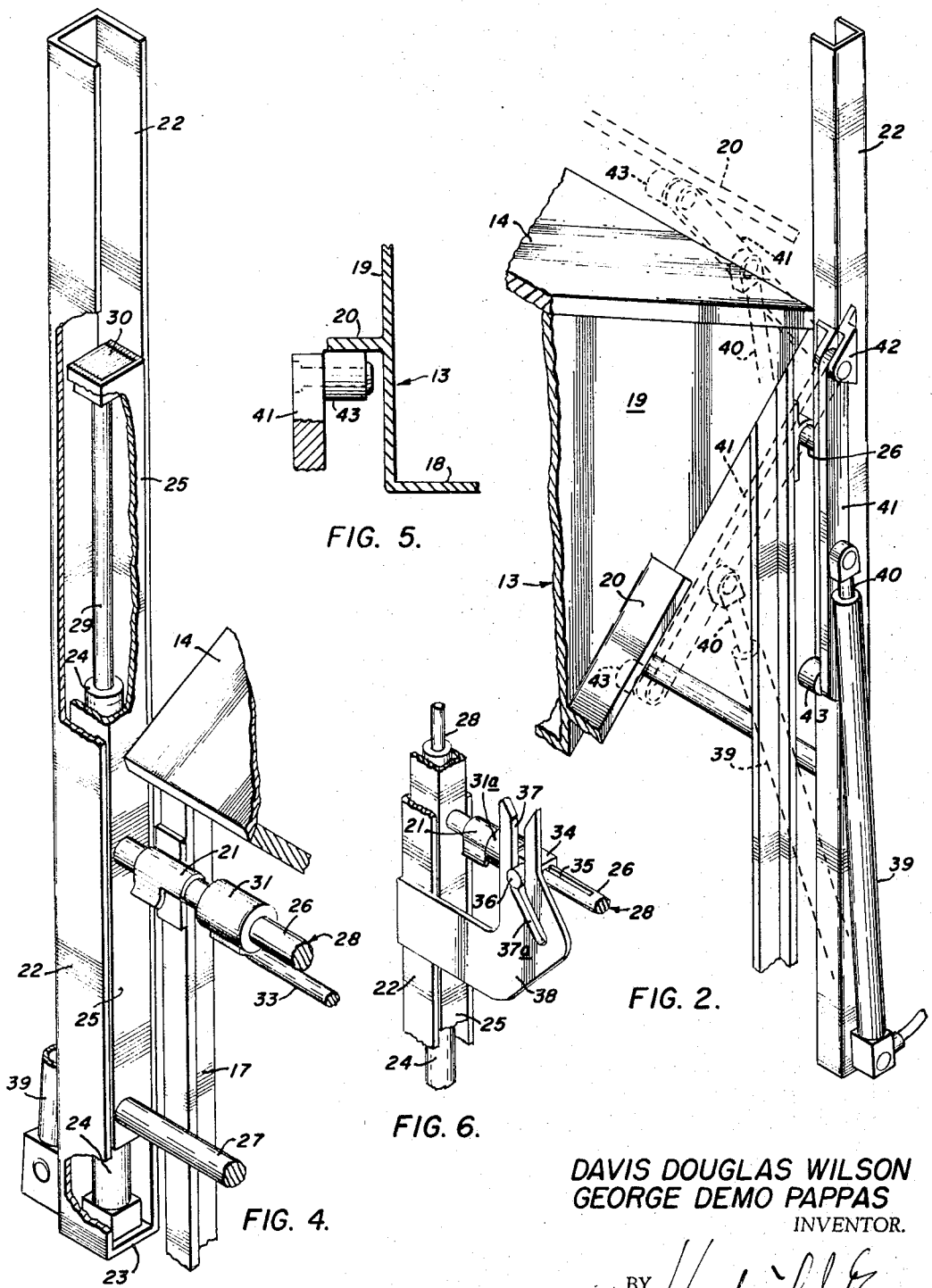

3,452,891
REFUSE BODY WITH SIDE LOADER
Davis Douglas Wilson and George Demo Pappas, Fort Worth, Tex., assignors to Fruehauf Corporation, Detroit, Mich., a corporation of Michigan
Filed Mar. 5, 1968, Ser. No. 710,552
Int. Cl. B65f 3/04
U.S. Cl. 214—302                                   1 Claim

ABSTRACT OF THE DISCLOSURE

Lifting and tilting means for a refuse hauling vehicle where collecting containers are raised and the contents are dumped into the vehicle body by a frame and pivotally mounted hydraulic cylinders.

---

This invention relates to refuse hauling vehicles of the type using specially built containers which are left at points of collection to be filled between trips and loaded into the vehicle body when it makes its rounds.

An object of the invention is to provide improved means for attaching full container to the side of the vehicle, elevating the container by hydraulic power and, in the same operation, tilting the container to empty it into the vehicle body.

Another object of the invention is to provide a lifting and emptying system which will handle containers of considerable capacity and weight and in which the containers may be supplied with hinged covers which conceal the refuse between trips of the vehicle but swing open automatically during the loading operation.

Another object of the invention is to provide a method for attaching the container to the side of the vehicle body which requires a minimum of maneuvering, and which releases the container completely at the end of the loading cycle.

These and other objects will become apparent from the following description and the accompanying drawing, in which:

FIGURE 2 is a partial isometric view of the container in the same position as in FIGURE 1 showing the dumping mechanism in detail.

FIGURE 4 is a broken perspective view of the attaching and raising mechanism.

FIGURE 5 is a cross sectional view taken along line 5—5 on FIGURE 1, and

FIGURE 6 is a perspective view of a second embodiment of the attaching mechanism.

Figure 1:
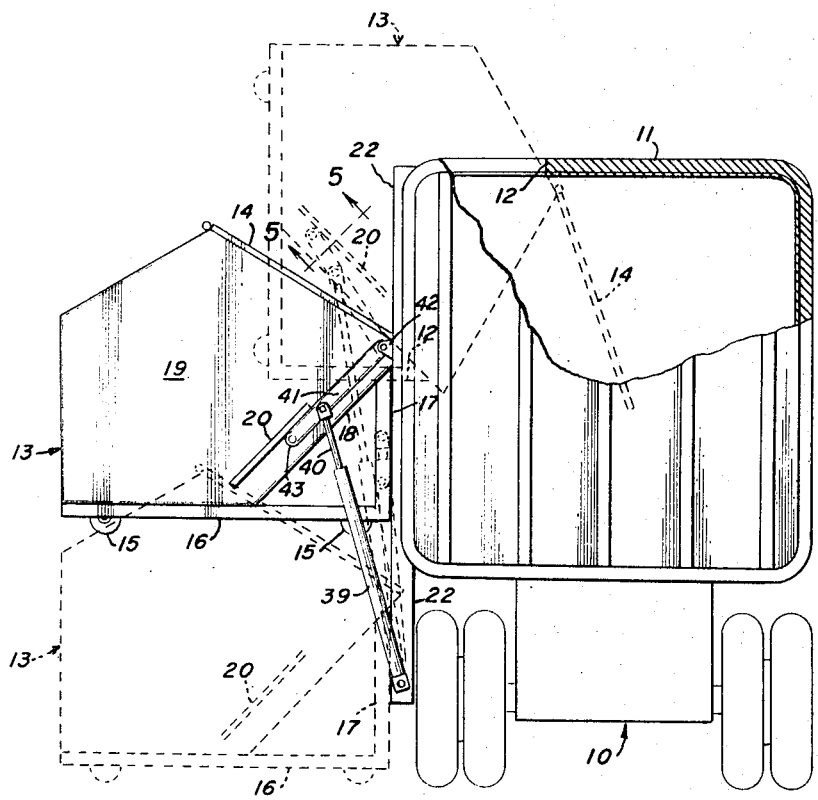
FIGURE 1 is a cutaway rear elevational view of a truck body with the container attached and partly raised.

In the drawing the numeral 10 generally designates a refuse truck with a body 11 having a loading opening 12 which is wide enough to receive a collecting container 13. The container 13 is provided with a sloping hinged lid 14 and rollers 15 which facilitate its being moved to the truck. The container 13 is further equipped with a pair of frames 16 having vertical members 17 which stand away from its sloping front 18 to provide a substantial bearing against the truck body 11 when the container is lifted into the position shown in FIGURE 1.

The vertical sides 19 of the container 13 are rigid and have bearing plates 20 which extend outwardly at a right angle to the sides 19 and are generally parallel with the sloping container front 18.

Figure 3:
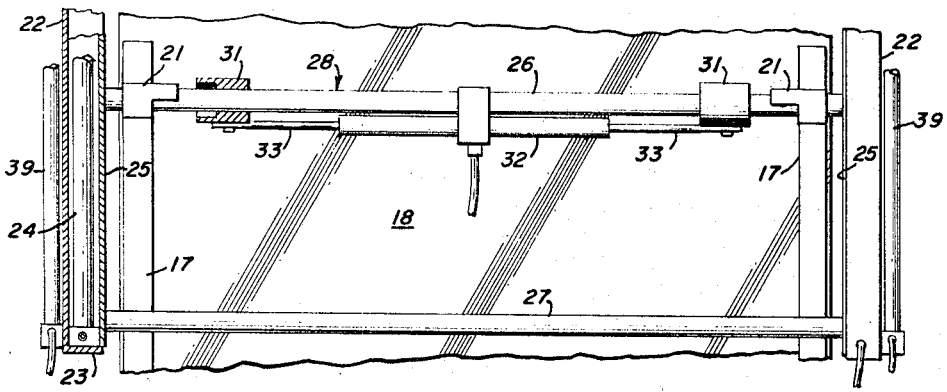
FIGURE 3 is a partial elevational view of the container from inside the truck showing how the container is attached to the truck.

As shown in FIGURES 3 and 4, a pair of hooks 21 are mounted on the vertical frame members 17 and provide means for attaching the container 13 to the truck body 11. A pair of inwardly facing channels 22 are vertically mounted on the side of the truck body 11 on each side of the opening 12 and reach to the top of the body on the truck 10. In each of these channels 22, bearing on the closed bottom end 23, there is a vertical hydraulic cylinder 24. Enclosing the cylinders 24 and running within the channels 22 there are a pair of outwardly facing channels 25 connected by an upper crossbar 26 and a lower crossbar 27 to make a rectangular frame 28 which slides vertically in the channels 22. Piston rods 29 operated by the hydraulic cylinders 24 are attached to the closed ends 30 of the channels 25 and serve as actuators to raise and lower the frame 28. When the container 13 is rolled up to the truck 10 the hooks 21 are positioned just above the upper crossbar 26 when the vertical frame members 17 of the container 13 bear against the crossbars 26 and 27.

Starting the frame 28 upwardly by means of hydraulic cylinders 24 causes the hooks 21 to engage the crossbar 26, thus lifting the container 13. A pair of cupped bushings 31 sliding on the crossbar 26 are actuated by a hydraulic cylinder 32 and piston rods 33 to fit over the hooks 21 and hold them on the crossbar 26 during the dumping operation. This function can also be accomplished mechanically as shown in FIGURE 6 wherein the cupped bushings 31a are backed up by an integral block 34 keyed into a slot 35 on the crossbar 26 by a cylindrical lug 36 which runs in a slot 37 on plate 38 welded to the vertical channel 22. The lug 36 normally rests at the bottom of the diagonal portion 37a of the slot 37 when the frame is at its lowest position, thus pulling back the cupped bushings 31a and freeing the hooks 21. As the frame 28 starts upward, the bushings 31a move over and engage the hooks 21 as shown in the drawing.

A pair of hydraulic cylinders 39 are pivotally attached to the vertical channels 22 at their lower ends. The piston rods 40 of the cylinders 39 are pivotally attached to a pair of levers 41 which are pivotally attached to brackets 42 welded to the upper portion of the vertical channels 22. The outer ends of the levers 41 are supplied with rollers 43 on their facing sides, the rollers being of sufficient length and properly spaced to engage the diagonal bearing plates 20 on the container 13.

The hydraulic system (not shown) of the truck 10 is programmed or manually controlled so that when the container 13 is lifted to the loading opening 12 as shown in FIGURE 1, the hydraulic cylinders 39 actuate the levers 41 and bring the rollers to bear against the plates 20 on the container 13. Since the hooks 21 are locked on the crossbar 26 when the cylinders 39 continue to push upwards, the container 13 pivots about the crossbar 26 to its extreme position shown by dotted lines in FIGURE 1 where the top of the container 13 stops against the top 11 of the truck within the loading opening 12. The hinged lid 14 of the container 13 swings open allowing the contents to spill into the truck.

Following the program, the cylinders 39 retract, allowing the container 13 to fall back to its horizontal position, the cylinders 24 lower the frame 28, the cupped bushings 31 are withdrawn and the container 13 is released from the truck.

The invention is not limited to the exemplary constructions herein shown and described, but may be made in various ways.

What is claimed is:

1. In combination, a side loading refuse truck, one or more containers for accumulating refuse, a rectangular framework slidably attached to the side of said truck and including one cross member, hydraulic means raising and lowering said frame, hooks on the front of said container pivotally engaging said cross member, cupped means slidably mounted on said cross member engaging said hooks and locking the same to said cross member, and hydraulically operated means bearing upwardly and outwardly on said container.

References Cited
UNITED STATES PATENTS

| | | | |
|---|---|---|---|
| 3,087,637 | 4/1963 | Fox | 214—302 |
| 3,269,572 | 8/1966 | Felts | 214—302 |

HUGO O. SCHULZ, *Primary Examiner.*

U.S. Cl. X.R.

314—315